(12) United States Patent
Ohata et al.

(10) Patent No.: US 12,057,603 B2
(45) Date of Patent: Aug. 6, 2024

(54) TERMINAL COMPONENT, SECONDARY BATTERY, AND METHOD FOR MANUFACTURING TERMINAL COMPONENT

(71) Applicant: Prime Planet Energy & Solutions, Inc., Tokyo (JP)

(72) Inventors: Kota Ohata, Toyota (JP); Takahiro Sakurai, Nagoya (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 0 days.

(21) Appl. No.: 17/826,172

(22) Filed: May 27, 2022

(65) Prior Publication Data

US 2022/0393317 A1  Dec. 8, 2022

(30) Foreign Application Priority Data

Jun. 3, 2021 (JP) ................. 2021-093605

(51) Int. Cl.
*H01M 50/562* (2021.01)
*H01M 50/564* (2021.01)

(52) U.S. Cl.
CPC ....... *H01M 50/562* (2021.01); *H01M 50/564* (2021.01)

(58) Field of Classification Search
CPC ...... H01M 50/543–567; H01M 50/176; Y02E 60/10; B23K 11/00–36
See application file for complete search history.

(56) References Cited

U.S. PATENT DOCUMENTS

| | | | |
|---|---|---|---|
| 2009/0223940 A1 | 9/2009 | Hosoya | |
| 2015/0318519 A1* | 11/2015 | Tsutsumi | H01M 50/562 429/163 |
| 2020/0212415 A1* | 7/2020 | Muroya | H01M 50/528 |
| 2021/0044065 A1* | 2/2021 | Barth | H01R 13/627 |
| 2021/0376431 A1 | 12/2021 | Enomoto | |

FOREIGN PATENT DOCUMENTS

| | | |
|---|---|---|
| CN | 207038611 U | 2/2018 |
| JP | H08203494 A | 8/1996 |
| JP | H9314353 A | 12/1997 |
| JP | 201417081 A | 1/2014 |
| JP | 2016192322 A | 11/2016 |
| JP | 2018039044 A | 3/2018 |
| JP | 2019075309 A | 5/2019 |
| JP | 2020107464 A | 7/2020 |
| WO | 2006016441 A1 | 2/2006 |

* cited by examiner

*Primary Examiner* — Michael L Dignan

(74) *Attorney, Agent, or Firm* — HAUPTMAN HAM, LLP

(57) ABSTRACT

A terminal component disclosed here includes a first metal and a second metal on which the first metal is overlaid. A joint portion joined by metal diffusion is formed at an interface between the first metal and the second metal. The second metal includes an insulating portion subjected to an insulating process in a portion except for the joint portion.

9 Claims, 2 Drawing Sheets

TERMINAL COMPONENT, SECONDARY BATTERY, AND METHOD FOR MANUFACTURING TERMINAL COMPONENT

CROSS REFERENCE TO RELATED APPLICATIONS

This application claims the benefit of priority to Japanese Patent Application No. 2021-093605 filed on Jun. 3, 2021. The entire contents of this application are hereby incorporated herein by reference

TECHNICAL FIELD

The present disclosure relates to a terminal component, a secondary battery, and a method for manufacturing a terminal component.

BACKGROUND

In a proposed technique, a terminal member is partially subjected to plating in order to enhance weldability of metal members constituting terminals of a secondary battery, for example.

Japanese Patent Application Publication No. 2014-017081 discloses a negative electrode terminal member including a negative electrode outer terminal plate provided with a metal plating layer, and a negative electrode terminal member having a negative electrode connection terminal. The negative electrode outer terminal plate is disposed on a battery lid and connected to a bus bar. The negative electrode outer terminal plate has a through hole. The negative electrode connection terminal penetrates the through hole and is caulked with the metal plating layer interposed therebetween. This structure is supposed to increase adhesion between the negative electrode terminal plate and the negative electrode connection terminal so that connection resistance can be reduced.

SUMMARY

Inventors of the present disclosure have studied the use of a terminal component of different metals as an external terminal of a secondary battery. In the case of using a secondary battery for a vehicle, vibrations in traveling of the vehicle are transferred to an external terminal of the secondary battery through a bus bar. In a case where the external terminal is made of a plurality of metals, vibrations are also transferred to a joint interface between the metals. The inventors would like to propose a terminal component having high durability enough to maintain a joint state at the joint interface between the metals even under application of an external force such as vibrations.

A terminal component disclosed here includes a first metal and a second metal on which the first metal is overlaid. A joint portion is disposed at an interface between the first metal and the second metal, the joint portion being joined by metal diffusion. The second metal includes an insulating portion subjected to an insulating process in a portion except for the joint portion.

The terminal component includes the joint portion having high joint strength, and thus, durability of the terminal component is enhanced.

The joint portion may include a center of the interface.

The insulating portion may be a layer formed by any one of anodic oxide coating, nickel plating, or resin coating.

The second metal may have a recess in a portion on which the first metal is overlaid, inside of the recess being wider than an opening, and the first metal may have a portion entering the recess.

In a secondary battery including a battery case and an electrode terminal attached to the battery case, the electrode terminal may include a portion constituted by the terminal component described above.

A method for manufacturing a terminal component disclosed here includes: preparing a first metal; preparing a second metal; and energizing the first metal and the second metal and joining a part of a boundary between the first metal and the second metal. The second metal includes a to-be-joint portion to be joined to the first metal at an interface with the first metal, and the second metal includes an insulating portion subjected to an insulating process in a portion except for the to-be-joint portion.

With this manufacturing method, joint strength of the joint portion joined by metal diffusion can be increased.

The to-be-joint portion may include a center of the interface.

The insulating portion may be a layer formed by any one of anodic oxide coating, nickel plating, or resin coating.

The preparing the second metal may include providing the to-be-joint portion in a surface of the second metal subjected to the insulating process by removing the insulating portion with any one of an ultrasonic process, a cutting process, or a laser abrasion process.

DETAILED DESCRIPTION

Figure 1:
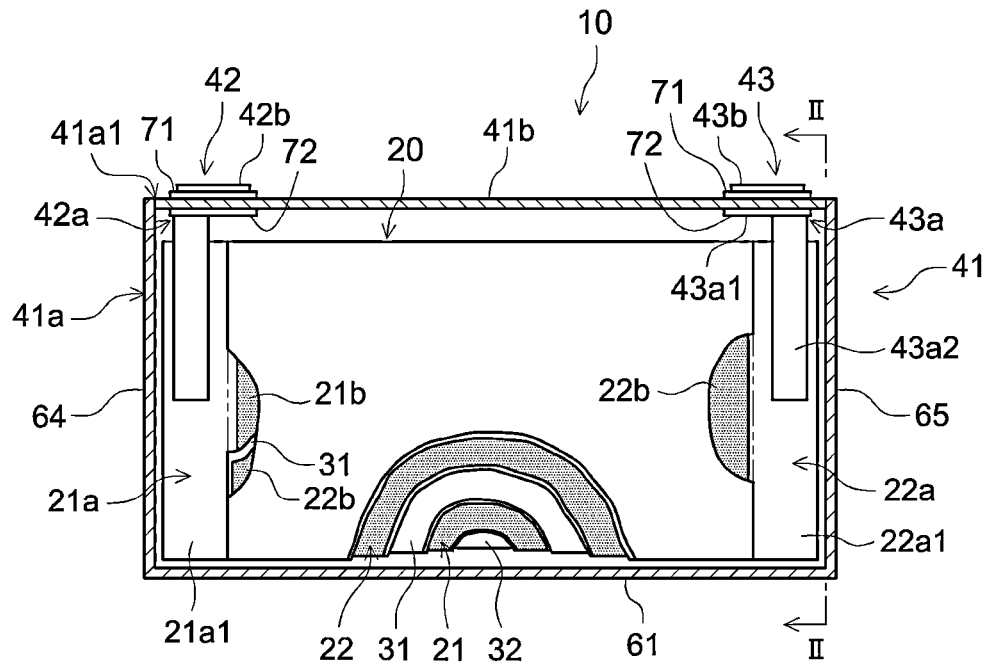
FIG. 1 is a partial cross-sectional view of a lithium ion secondary battery 10.

An embodiment of a terminal component and a secondary battery disclosed here will be described hereinafter. An embodiment described here is, of course, not intended to particularly limit the present disclosure. The present disclosure is not limited to the embodiment disclosed here unless otherwise specified. Each of the drawings is schematically drawn and does not necessarily reflect an actual object. Members and parts having the same functions are denoted by the same reference numerals as appropriate, and description for the same members and parts will not be repeated. An expression such as "A to B" indicating a numerical range means "A or more and B or less" unless otherwise specified. Dimensional relationships (e.g., length, width, and thickness) in the drawings do not reflect actual dimensional relationships.

A "secondary battery" herein generally refers to a power storage device in which charge/discharge reaction occurs by transfer of charge carriers between a pair of electrodes (positive and negative electrodes) through an electrolyte. The secondary battery herein includes, for example, a capacitor such as an electric double layer capacitor as well as a so-called storage battery such as a lithium ion secondary battery, a nickel-metal hydride battery, and a nickel-cadmium battery. The following description is directed to an embodiment of a lithium ion secondary battery among the secondary batteries described above.

Lithium Ion Secondary Battery 10

Figure 2:
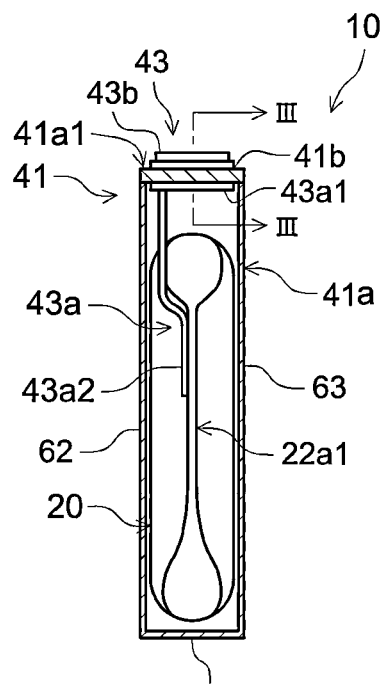
FIG. 2 is a cross-sectional view taken along line II-II in FIG. 1.

FIG. 1 is a partial cross-sectional view of a lithium ion secondary battery 10. FIG. 1 illustrates a state in which the inside of a substantially rectangular parallelepiped battery case 41 is exposed along a wide face thereof at one side. The lithium ion secondary battery 10 illustrated in FIG. 1 is a so-called sealed battery. FIG. 2 is a cross-sectional view taken along line II-II in FIG. 1. FIG. 2 schematically illustrates a partial cross section in a state where the inside of the substantially rectangular parallelepiped battery case 41 is exposed along a narrow face thereof at one side.

As illustrated in FIG. 1, the lithium ion secondary battery 10 includes an electrode body 20, the battery case 41, a positive electrode terminal 42, and a negative electrode terminal 43.

Electrode Body 20

The electrode body 20 is housed in the battery case 41 while being covered with, for example, an insulating film (not shown). The electrode body 20 includes a positive electrode sheet 21 as a positive electrode element, a negative electrode sheet 22 as a negative electrode element, and separator sheets 31 and 32 as separators. The positive electrode sheet 21, the first separator sheet 31, the negative electrode sheet 22, and the second separator sheet 32 are long strip members.

The positive electrode sheet 21 includes a positive electrode current collector foil 21a (e.g., aluminium foil) having a predetermined width and a predetermined thickness, and a positive electrode active material layer 21b including a positive electrode active material and disposed on each surface of the positive electrode current collector foil 21a except for a non-formed portion 21a1 having a uniform width at one end on one side in the width direction. The positive electrode active material can release lithium ions during charging and absorb lithium ions during discharging in a manner similar to a lithium transition metal composite material in, for example, a lithium ion secondary battery. Various materials have been generally proposed for the positive electrode active material, as well as a lithium transition metal composite material, and the positive electrode active material is not limited to a specific material.

The negative electrode sheet 22 includes a negative electrode current collector foil 22a (copper foil in this embodiment) having a predetermined width and a predetermined thickness, and a negative electrode active material layer 22b including a negative electrode active material and disposed on each surface of the negative electrode current collector foil 22a except for a non-formed portion 22a1 having a uniform width at an edge on one side in the width direction. The negative electrode active material can store lithium ions during charging and release, during discharging, lithium ions stored during charging in a manner similar to natural graphite in, for example, a lithium ion secondary battery. Various materials have been generally proposed for the negative electrode active material, and the negative electrode active material is not limited to a specific material.

The separator sheets 31 and 32 are, for example, porous resin sheets through which an electrolyte having required heat resistance can pass. Various materials have also been proposed for the separator sheets 31 and 32, and the separator sheets 31 and 32 are not limited to a specific material.

In this embodiment, the width of the negative electrode active material layer 22b is wider than the positive electrode active material layer 21b, for example. The width of each of the separator sheets 31 and 32 is wider than the negative electrode active material layer 22b. The non-formed portion 21a1 of the positive electrode current collector foil 21a and the non-formed portion 22a1 of the negative electrode current collector foil 22a are disposed at opposite sides in the width direction. The positive electrode sheet 21, the first separator sheet 31, the negative electrode sheet 22, and the second separator sheet 32 are oriented in the length direction, and are sequentially stacked and wound together. The negative electrode active material layer 22b covers the positive electrode active material layer 21b with the separator sheets 31 and 32 interposed therebetween. The negative electrode active material layer 22b is covered with the separator sheets 31 and 32. The non-formed portion 21a1 of the positive electrode current collector foil 21a extends off from one side, in the width direction, of each of the separator sheets 31 and 32. The non-formed portion 22a1 of the negative electrode current collector foil 22a extends off from the separator sheets 31 and 32 at the opposite side in the width direction.

As illustrated in FIG. 1, the electrode body 20 described above is in a flat state along one flat surface including a winding axis so as to be housed in a case body 41a of the battery case 41. The non-formed portion 21a1 of the positive electrode current collector foil 21a is disposed along one side of the winding axis of the electrode body 20, and the non-formed portion 22a1 of the negative electrode current collector foil 22a is disposed along the opposite side of the winding axis of the electrode body 20.

Battery Case 41

As illustrated in FIG. 1, the battery case 41 houses the electrode body 20. The battery case 41 includes the case body 41a having a substantially rectangular parallelepiped shape whose one side surface has an opening, and a lid 41b attached to the opening. In this embodiment, from the viewpoint of obtaining weight reduction and required stiffness, each of the case body 41a and the lid 41b is made of aluminium or an aluminium alloy mainly containing aluminium.

Case Body 41a

The case body 41a has a rectangular parallelepiped shape whose one side surface has an opening. The case body 41a includes a substantially square bottom surface 61, a pair of wide faces 62 and 63 (see FIG. 2), and a pair of narrow faces 64 and 65. Each of the pair of wide faces 62 and 63 rises from a longer side of the bottom surface 61. Each of the pair of narrow faces 64 and 65 rises from a shorter side of the bottom surface 61. One side surface of the case body 41a has an opening 41a1 surrounded by the pair of wide faces 62 and 63 and the pair of narrow faces 64 and 65.

Lid 41b

The lid 41b is attached to the opening 41a1 of the case body 41a surrounded by the longer sides of the pair of wide faces 62 and 63 (see FIG. 2) and the shorter sides of the pair of narrow faces 64 and 65. A peripheral portion of the lid 41b is joined to the rim of the opening 41a1 of the case body 41a. This joint is preferably made by, for example, continuous welding without a gap. The welding can be performed by, for example, laser welding.

In this embodiment, the lid 41b is provided with the positive electrode terminal 42 and the negative electrode terminal 43. The positive electrode terminal 42 includes an inner terminal 42a and an external terminal 42b. The negative electrode terminal 43 includes an inner terminal 43a and an external terminal 43b. Each of the inner terminals 42a and 43a is attached to the inner side of the lid 41b with an insulator 72 interposed therebetween. Each of the external terminals 42b and 43b is attached to the outer side of the lid 41b with a gasket 71 interposed therebetween. Each of the inner terminals 42a and 43a extends inside the case body 41a. The inner terminal 42a of the positive electrode is connected to the non-formed portion 21a1 of the positive electrode current collector foil 21a. The inner terminal 43a of the negative electrode is connected to the non-formed portion 22a1 of the negative electrode current collector foil 22a.

As illustrated in FIG. 1, the non-formed portion 21a1 of the positive electrode current collector foil 21a and the non-formed portion 22a1 of the negative electrode current collector foil 22a of the electrode body 20 are attached to the inner terminals 42a and 43a respectively attached to both side portions of the lid 41b in the longitudinal direction. The electrode body 20 is housed in the battery case 41b while being attached to the inner terminals 42a and 43a attached to the lid 41b. In this embodiment, the electrode body 20 of a winding-type is employed as an example. The structure of the electrode body 20 is not limited to this type. The structure of the electrode body 20 may be a stacked structure in which positive electrode sheets and negative electrode sheets are alternately stacked with separator sheets interposed therebetween. A plurality of electrode bodies 20 may be housed in the battery case 41.

The battery case 41 may house an unillustrated electrolyte together with the electrode body 20. As the electrolyte, a nonaqueous electrolyte in which a supporting electrolyte is dissolved in a nonaqueous electrolyte. Examples of the non-aqueous solvent include carbonate-based solvents such as ethylene carbonate, dimethyl carbonate, and ethyl methyl carbonate. Examples of the supporting electrolyte include fluorine-containing lithium salt such as $LiPF_6$.

Figure 3:
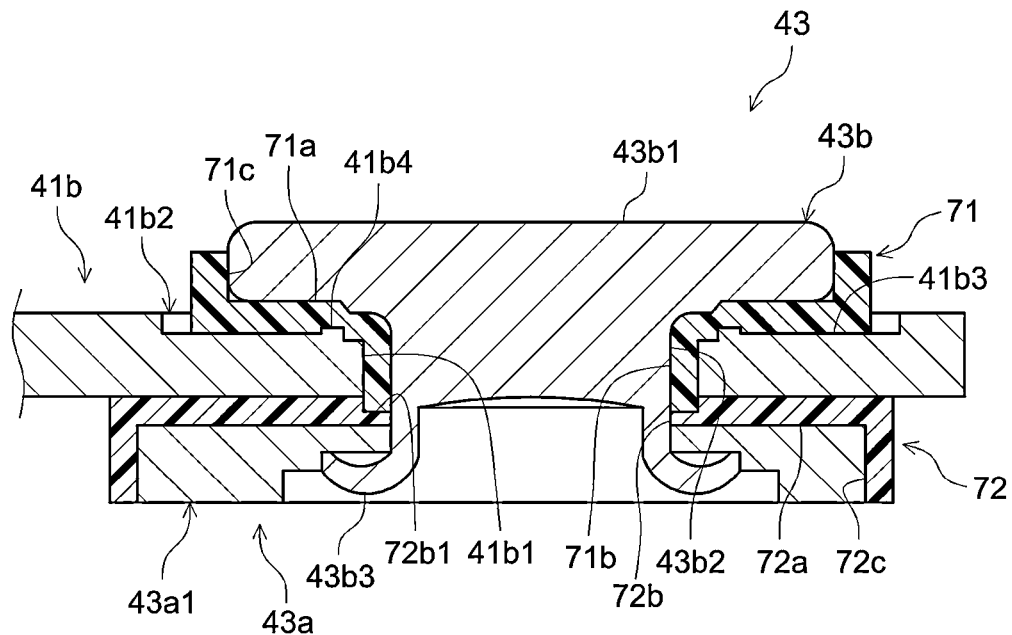
FIG. 3 is a cross-sectional view taken along line in FIG. 2.

FIG. 3 is a cross-sectional view taken along line in FIG. 2. FIG. 3 shows a cross section of a portion in which the negative electrode terminal 43 is attached to the lid 41b. In this embodiment, a member formed by joining different metals is used for the external terminal 43b of the negative electrode. FIG. 3 does not show, for example, a structure of different metals constituting the external terminal 43b and interfaces of different metals, and schematically illustrates a cross-sectional shape of the external terminal 43b.

As illustrated in FIG. 3, the lid 41b has an attachment hole 41b1 for attaching the external terminal 43b of the negative electrode. The attachment hole 41b1 penetrates the lid 41b at a predetermined position of the lid 41b. The inner terminal 43a and the external terminal 43b of the negative electrode are attached to the attachment hole 41b1 of the lid 41b with the gasket 71 and the insulator 72 interposed therebetween. A step 41b2 to which the gasket 71 is attached around the attachment hole 41b1 is provided at the outer side of the attachment hole 41b1. The step 41b2 has a seat surface 41b3 on which the gasket 71 is disposed. The seat surface 41b3 has a projection 41b4 for positioning the gasket 71.

Here, as illustrated in FIG. 3, the external terminal 43b of the negative electrode includes a head 43b1, a shaft 43b2, and a caulking strip 43b3. The head 43b1 is disposed outside the lid 41b. The head 43b1 is a substantially flat plate portion larger than the attachment hole 41b1. The shaft 43b2 is attached to the attachment hole 41b1 with the gasket 71 interposed therebetween. The shaft 43b2 projects downward from a substantially center portion of the head 43b1. As illustrated in FIG. 3, the caulking strip 43b3 is a portion to be caulked to the inner terminal 43a of the negative electrode inside the lid 41b. The caulking strip 43b3 extends from the shaft 43b2, is inserted in the lid 41b, and then is bent to be caulked to the inner terminal 43a of the negative electrode.

Gasket 71

As illustrated in FIG. 3, the gasket 71 is attached to the attachment hole 41b1 and the seat surface 41b3 of the lid 41b. In this embodiment, the gasket 71 includes a seat 71a, a boss 71b, and a side wall 71c. The seat 71a is attached to the seat surface 41b3 provided on the outer surfaced around the attachment hole 41b1 of the lid 41b. The seat 71a has a substantially flat surface in conformity with the seat surface 41b3. The seat 71a has a recess in accordance with the projection 41b4 of the seat surface 41b3. The boss 71b projects from the bottom surface of the seat 71a. The boss 71b has an outer shape along the inner surface of the attachment hole 41b1 so as to be attached to the attachment hole 41b1 of the lid 41b. The inner surface of the boss 71b serves as an attachment hole to which the shaft 43b2 of the external terminal 43b is attached. The side wall 71c rises upward from the periphery of the seat 71a. The head 43b1 of the external terminal 43b is attached to a portion of the gasket 71 surrounded by the side wall 71c.

The gasket 71 is disposed between the lid 41b and the external terminal 43b, and ensures insulation between the lid 41b and the external terminal 43b. The gasket 71 ensures hermeticity of the attachment hole 41b1 of the lid 41b. In view of this, it is preferable to use a material having high chemical resistance and high weather resistance. In this embodiment, PFA is used for the gasket 71. PFA is a copolymer of tetrafluoroethylene and perfluoroalkoxyethylene (tetrafluoroethylene-perfluoroalkylvinylether copolymer). A material for the gasket 71 is not limited to PFA.

Insulator 72

The insulator 72 is attached to the inner side of the lid 41b around the attachment hole 41b1 of the lid 41b. The insulator 72 includes a base 72a, a hole 72b, and a side wall 72c. The base 72a is disposed along the inner surface of the lid 41b. In this embodiment, the base 72a is a substantially flat-plate portion. The base 72a is disposed along the inner surface of the lid 41b, and has a size with which the base 72a can be housed in the case body 41a and does not extend out of the lid 41b. The hole 72b is a hole in conformity with the inner surface of the boss 71b of the gasket 71. In this embodiment, the hole 72b is disposed in a substantially center portion of the base 72a. A side surface facing the inner surface of the lid 41b has a step 72b1 that is recessed around the hole 72b. The step 72b1 houses a front end of the boss 71b of the gasket 71 attached to the attachment hole 41b1 without interference. The side wall 72c extends downward from the peripheral portion of the base 72a. The base 72a houses a base 43a1 disposed at one end of the inner terminal 43a of the negative electrode. The insulator 72 is disposed inside the battery case 41, and thus, preferably has required chemical resistance. In this embodiment, PPS is used for the insulator 72. PPS is poly phenylene sulfide resin. The material for the insulator 72 is not limited to PPS.

The inner terminal 43a of the negative electrode includes the base 43a1 and a connection strip 43a2 (see FIGS. 1 and 2). The base 43a1 is attached to the base 72a of the insulator 72. In this embodiment, the base 43a1 has a shape in conformity with the inner side of the side wall 72c around the base 72a of the insulator 72. The connection strip 43a2 extends from one end of the base 43a1, and extends in the case body 41a to be connected to the non-formed portion 22a1 of the negative electrode of the electrode body 20 (see FIGS. 1 and 2).

In this embodiment, the gasket 71 is attached to the outer side of the lid 41b with the boss 71b attached to the attachment hole 41b1. The external terminal 43b is attached to the gasket 71. At this time, the shaft 43b2 of the external terminal 43b is inserted in the boss 71b of the gasket 71, and the head 43b1 of the external terminal 43b is disposed on the seat 71a of the gasket 71. The insulator 72 and the negative electrode terminal 43 are attached to the inner side of the lid 41b. Then, as illustrated in FIG. 3, the caulking strip 43b3 of the external terminal 43b is bent and caulked to the base 43a1 of the negative electrode terminal 43. The caulking strip 43b3 of the external terminal 43b and the base 43a1 of the negative electrode terminal 43 are preferably partially joined by welding or metal joint in order to increase conductivity.

In the inner terminal 42a of the positive electrode of the lithium ion secondary battery 10, the required level of oxidation-reduction resistance is not higher than that in the negative electrode. From the viewpoint of required oxidation-reduction resistance and weight reduction, aluminium is used for the inner terminal 42a (see FIG. 1) of the positive electrode. On the other hand, in the inner terminal 43a of the negative electrode, the required level of the oxidation-reduction resistance is higher than that in the positive electrode. In view of this, copper is used for the inner terminal 43a of the negative electrode. From the viewpoint of weight reduction and cost reduction, aluminium or an aluminium alloy is used for the bus bar to which the external terminal 43b is connected.

The inventors of the present disclosure consider using different types of metals between a portion connected to the inner terminal 43a and connected to the bus bar. That is, the inventors consider using a metal having high weldability for each of the portion connected to the bus bar and the portion connected to the inner terminal 43a in the external terminal 43b. However, according to the finding of the inventors, joint of different metals has problems in conductivity and joint strength. The inventors consider mechanical fastening of metals and metallurgical joint in order to obtain conductivity between metals.

A terminal component 200 disclosed here will now be described hereinafter together with a method for manufacturing the terminal component 200. In this embodiment, the terminal component 200 is made of copper and aluminium. Metals constituting the external terminal 43b are not limited to copper and aluminium.

Terminal Component 200

Figure 4:
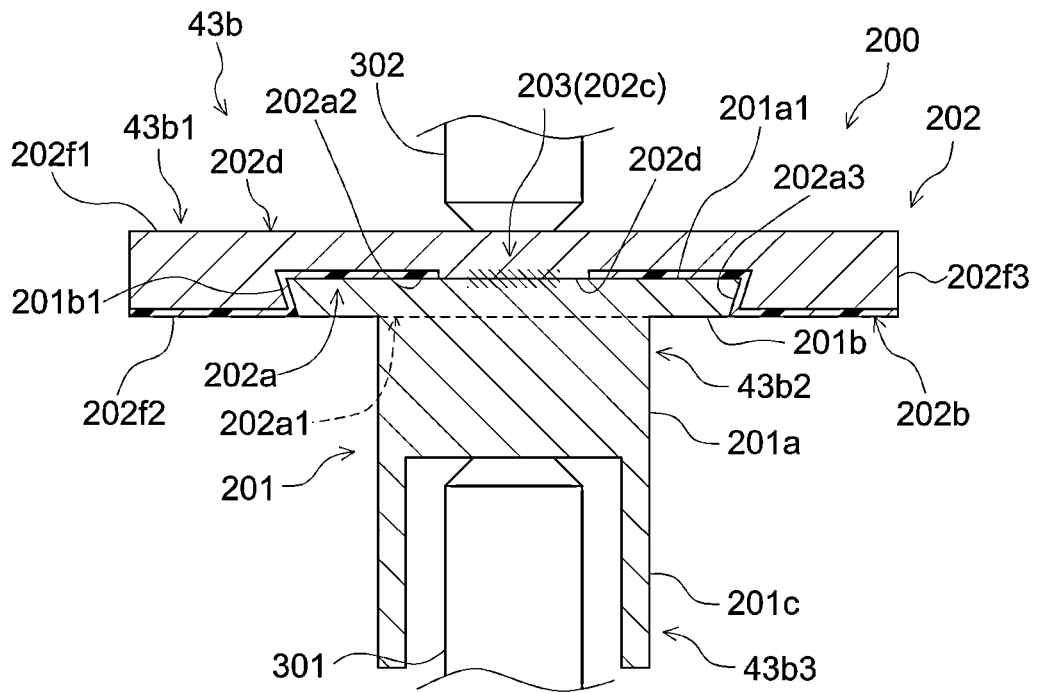
FIG. 4 is a cross-sectional view schematically illustrating a terminal component 200.

FIG. 4 is a cross-sectional view schematically illustrating the terminal component 200. The terminal component 200 can be used for the external terminal 43b of the negative electrode illustrated in FIG. 3. FIG. 4 schematically illustrates a structure of different metals and an interface between the different metals in the terminal component 200. FIG. 4 also schematically illustrates a process of joining a first metal 201 and a second metal 202 constituting the terminal component 200.

As illustrated in FIG. 4, the terminal component 200 includes the first metal 201 and the second metal 202 overlaid on the first metal 201. A joint portion 203 joined by metal diffusion are formed in a part of interfaces 202a2 and 202a3 between the first metal 201 and the recess 202a of the second metal 202. The second metal 202 includes an insulating portion 202b subjected to an insulating process in a part of the surface of the recess 202a except for the joint portion 203. In this embodiment, the second metal 202 includes the recess 202a in a portion overlaid on the first metal 201. The inside of the recess 202a is wider than the opening 202a1. The first metal 201 has a portion entering the recess 202a. The joint portion 203 is formed in a part of the boundary between the first metal 201 and a bottom portion 202a2 of the recess 202a of the second metal 202. The second metal 202 includes an insulating portion 202b subjected to an insulating process in a part of the surface of the recess 202a except for the joint portion 203.

The method for manufacturing the terminal component 200 includes the following steps of:
(a) preparing the first metal 201;
(b) preparing the second metal 202; and
(c) energizing the first metal 201 and the second metal 202 and joining a part of the boundary between the first metal 201 and the second metal 202.

Here, the recess 202a of the second metal 202 has a to-be-joint portion 202c to be joined with the first metal 201. The second metal 202 includes the insulating portion 202b subjected to an insulating process in a portion except for the to-be-joint portion 202c.

Step (a): Preparing First Metal 201

In step (a), the first metal 201 is prepared.

The first metal 201 is oriented to face the inside of the battery case 41 (see FIGS. 1 and 2) of the terminal component 200, and constitutes a portion connected to the inner terminal 43a of the negative electrode (see FIG. 3). In this embodiment, the first metal 201 is made of copper. The first metal 201 can be prepared by processing a material (copper in this embodiment) of the first metal 201 into a predetermined shape with a known metal processing technique. The metal processing is performed by, for example, a forging process or a cutting process.

In this embodiment, the first metal 201 includes a shaft 201a and a flange 201b extending from one end of the shaft 201a radially outward. In the first metal 201, an end portion 201a1 provided with the flange 201b has a substantially circular shape. The flange 201b is continuously formed in the circumferential direction of the shaft 201a. An outer rim 201b1 of the flange 201b is constituted by a tapered surface that tilts such that the outer diameter gradually decreases from the end surface of the first metal 201 including the flange 201b toward the other side surface. The shaft 201a includes a portion 201c on a side opposite to the flange 201b. The portion 201c serves as the caulking strip 43b3 to be caulked to the inner terminal 43a.

Step (b): Preparing Second Metal 202

In step (b), the second metal 202 is prepared. This step may include performing an insulating process on a part of the second metal 202.

The second metal 202 constitutes a portion of the terminal component 200 exposed to the outside of the battery case 41 and connected to an external connection part such as the bus bar. In this embodiment, the second metal 202 has the recess 202a whose inside is wider than the opening 202a1.

In this embodiment, the second metal 202 has malleability and is made of aluminium having stiffness lower than that of the first metal 201. The second metal 202 has a plate shape, and has one surface 202f1 connected to an external connection part. The second metal 202 has the recess 202a in the other surface 202f2. The recess 202a has a shape that can cover the end portion 201a1 of the first metal 201 including the flange 201b. In this embodiment, a side circumferential surface 202a3 of the recess 202a is a tapered surface that tilts to gradually expand from the opening 202a1 toward the bottom portion 202a2. The bottom portion 202a2 of the recess 202a of the second metal 202 has a size corresponding to an outer diameter (end portion 201a1) of the flange 201b of the first metal 201. As described above, the recess 202a tilts from the opening 202a1 toward the bottom portion 202a2. Thus, the opening 202a1 of the recess 202a has an opening area narrower than the outer diameter of the flange 201b of the first metal 201.

The material (aluminium in this embodiment) of the second metal 202 is subjected to a known metal process such as a forging process and a cutting process so that the second metal 202 is processed into the shape described above.

The second metal 202 has the to-be-joint portion 202c to be joined to the first metal 201. The to-be-joint portion 202c is a part of the surface facing the end portion 201a1 of the first metal 201 (i.e., the bottom portion 202a2 of the recess 202a). In this embodiment, the to-be-joint portion 202c includes the center of the bottom portion 202a2 of the recess 202a (i.e., the center of the interface 202a2 between the first metal 201 and the second metal 202).

The insulating portion 202b is a portion in which the surface of the second metal 202 is subjected to an insulating process in order to have an electrical resistivity higher than that of the to-be-joint portion 202c. The surface of the second metal 202 includes the insulating portion 202b and a non-insulating portion 202d having an electrical resistivity lower than that of the insulating portion 202b. The insulating portion 202b is disposed at least in the surface of the recess 202a. The non-insulating portion 202d is provided at least in the to-be-joint portion 202c.

As described above, in this embodiment, the to-be-joint portion 202c includes the center of the bottom portion 202a2 of the recess 202a. The insulating portion 202b is disposed in a portion of the surface of the recess 202a except for the to-be-joint portion 202c. That is, the insulating portion 202b is disposed in a portion of the surface of the recess 202a except for a portion including the center of the bottom portion 202a2, and is also disposed in the side circumferential surface 202a3. In this embodiment, the insulating portion 202b is also disposed in the surface 202f2 having the recess 202a. Accordingly, insulation between the head 43b1 of the external terminal 43b and the lid 41b is enhanced (see FIG. 3). The non-insulating portion 202d is provided in the to-be-joint portion 202c, the surface 202f1, a side surface 202f3.

The insulating portion 202b can be a layer formed by selectively performing an insulating process on the surface of the second metal 202. The structure of the insulating portion 202b is not specifically limited, and may be, for example, a layer formed by anodic oxide coating, nickel plating, resin coating, or other processes (hereinafter referred to as an insulating layer). The thickness of the insulating layer is not specifically limited, and may be 30 μm or less, and may be, for example, 20 μm or less or 10 μm or less. The non-insulating portion 202d is not necessarily provided with such an insulating layer. The non-insulating portion 202d may be provided with an insulating layer thinner than the insulating portion 202b so as to have an electrical resistance lower than that of the insulating portion. In this embodiment, no insulating layer is formed on the non-insulating portion 202d including the to-be-joint portion 202c. That is, aluminium is exposed in the to-be-joint portion 202c.

Anodic oxide coating is a treatment for forming an oxide coating on an aluminium surface. In a case where the second metal 202 is made of aluminium, an insulating layer having high strength, high corrosion resistance, and high insulation can be formed by performing anodic oxide coating on the surface of the second metal 202. Nickel plating is a treatment of adding nickel plating having a higher electrical resistivity than those of aluminium and copper, to the surface of the second metal 202. Nickel plating can be added by electrolytic plating or electroless plating. In the case of forming an insulating layer by nickel plating, nickel plating is preferably added by electrolytic plating from the viewpoint of forming an insulating layer (nickel plating layer) having a high melting point and a low reactivity.

In the case of performing an insulating process by anodic oxide coating or nickel plating, the insulating portion 202b and the non-insulating portion 202d may be formed by forming an insulating layer by performing these treatments on the surface of the second metal 202 and then partially removing the insulating layer, for example. The method for removing the insulating layer is not specifically limited, and the insulating portion may be removed by an ultrasonic process or a cutting process, for example. In the cutting process, ultrasonic vibrations are applied to a portion covered with an end mill having a higher hardness than that of a coating film so that the covered portion can be removed. In the ultrasonic process, ultrasonic vibrations are applied to a portion covered with an ultrasonic tool having a higher hardness than that of a coating film so that the covered portion can be removed. In the case of adjusting the thickness of the insulating layer with such methods, a mark caused by pressing the end mill or the ultrasonic tool might remain. In removing the insulating portion by an ultrasonic process, oil and dirt, for example, on the surface subjected to ultrasonic vibrations can also be removed. Thus, the surface to be joined in a subsequent process (i.e., the bottom portion 202a2) can be kept in a favorable state.

In a case where the to-be-joint portion 202c is covered with the insulating layer, electrical resistivity of the to-be-joint portion 202c is preferably reduced by removing the insulating layer covering the to-be-joint portion 202c. The insulating layer covering the to-be-joint portion 202c does not need to be completely removed. That is, in energizing the first metal 201 and the second metal 202 in a subsequent process, it is sufficient to remove the insulating layer to such a degree that a current is concentrated in the to-be-joint portion 202c, as compared to the surroundings. In view of this, the thickness of the insulating layer of the to-be-joint portion 202c is less than or equal to the thickness of the insulating layer of the insulating portion 202b formed by anodic oxide coating or nickel plating. The thickness of the insulating layer of the to-be-joint portion 202c is preferably 0.5 times or less, and may be 0.2 times or less, as large as the thickness of the insulating layer of the insulation portion 202b formed by anodic oxide coating or nickel plating.

The method for performing the insulating process by anodic oxide coating or nickel plating is not limited to the method described above. For example, anodic oxide coating or nickel plating may be performed with a portion of the surface of the second metal 202 to be the non-insulating portion 202d being masked. The method for removing the insulating layer of the non-insulating portion 202d after the insulating process and the method for masking the non-insulating portion 202d before the insulating process may be combined.

Resin coating is a treatment of coating the surface of the second metal 202 with a resin having high electrical resistivity. For example, the insulating portion 202b may be formed by coating the surface of the second metal 202 with a liquid or semi-solid resin and drying and hardening the resin. The type of the resin for coating is not specifically limited, and the resin preferably has heat resistance to an operating temperature of a secondary battery, corrosion resistance to electrolyte, acid, and alkali, and high mechanical property, for example. Examples of the resin for coating include a polybenzimidazole (PBI) resin and a polyimide (PI) resin. The thickness of the resin for coating is not specifically limited, and is preferably 20 μm or less, preferably 10 μm or less, and may be 5 μm or less, from the viewpoint of forming a so-called caulking structure with the first metal 201 in a subsequent process.

In the case of performing the insulating process by resin coating, the insulating portion 202b and the non-insulating portion 202d may be formed by coating the surface of the second metal 202 with an (insulating) resin and then partially removing the resin, for example. The resin applied to the surface of the second metal 202 can be removed by, for example, laser abrasion. The insulating portion 202b and the non-insulating portion 202d may be formed by performing coating not on a portion to be the non-insulating portion 202d but only on a portion to be the insulating portion 202b in coating the surface of the second metal 202 with the resin. The method of partially removing the resin after coating with the resin and the method of partially coating with the resin may be combined. In resin coating, an operation in partially coating with the resin or in removing the resin can be relatively easily performed. That is, the insulating portion 202b and the non-insulating portion 202d can be formed without a complicated process.

In the case of performing the insulating process by resin coating, the coating is preferably performed in such an area that the resin is not damaged by heat generated in energizing the first metal 201 and the second metal 202 in a subsequent process. The area is preferably set such that the temperature of the resin does not exceed a glass transition temperature by heat generated in energization. For example, the non-insulating portion 202d is set to be larger than the to-be-joint portion 202c so that concentration of a current in energization can be reduced.

Step (c): Energizing First Metal 201 and Second Metal 202 for Joint

In step (c), the first metal 201 and the second metal 202 are energized so that the interfaces 202a2 and 202a3 between the first metal 201 and the second metal 202 are partially joined by metal diffusion.

In this embodiment, part of the first metal 201 enters the recess 202a of the second metal 202 so that the first metal 201 and the second metal 202 are mechanically joined and then are joined by diffusion of metals.

First, the first metal 201 and the second metal 202 are pressurized to each other so that the first metal 201 enters the recess 202a. For example, a required pressing pressure is applied with, for example, a pressor with the second metal 202 being overlaid on the end portion 201a1 of the first metal 201. Accordingly, the second metal 202 is plastically deformed, and a portion of the first metal 201 including the flange 201b enters the recess 202a. As illustrated in FIG. 4, the end portion 201a1 including the flange 201b of the first metal 201 is placed in the recess 202a of the second metal 202. The first metal 201 and the second metal 202 have a so-called caulking structure. The first metal 201 and the second metal 202 are thus mechanically fastened together so that a high joint strength between the first metal 201 and the second metal 202 can be obtained.

Next, in this embodiment, the first metal 201 and the second metal 202 are joined together by so-called resistance welding. The first metal 201 and the second metal 202 mechanically fastened in step (c) are sandwiched between electrodes 301 and 302 and are energized. Energization conditions are not specifically limited, and a current value can be about 9 kA to 12 kA, a pressure can be about 50 N to 500 N, and an energization time can be about 20 ms to 300 ms, for example.

As described above, in the to-be-joint portion 202c of the second metal 202, no insulating layer is formed, or if an insulating layer is formed, the insulating layer is thinner than the insulating portion 202b. Thus, at the boundary between the first metal 201 and the second metal 202, electrical resistivity of the to-be-joint portion 202c is kept low. When the first metal 201 and the second metal 202 sandwiched between the electrodes 301 and 302 are energized, a current is concentrated in the to-be-joint portion 202c. When a current is concentrated in the to-be-joint portion 202c, the calorific volume becomes large in a portion in which a current is concentrated. In the to-be-joint portion 202c with a large calorific volume, metals constituting the first metal 201 and the second metal 202 are diffused. Consequently, the joint portion 203 is formed. In this embodiment, copper constituting the first metal 201 is diffused to aluminium constituting the second metal 202, and at the same time, aluminium constituting the second metal 202 is diffused to copper constituting the first metal 201 so that the joint portion 203 is thereby formed.

In this manner, the terminal component 200 can be manufactured.

The joint portion 203 of the terminal component 200 is joined by so-called metallurgical joint. Accordingly, conduction resistance between the first metal 201 and the second metal 202 is kept low.

Depending on energization conditions and the structure of the insulating portion 202b, for example, a joint structure in which one metal is diffused to another metal can be obtained in the joint portion 203. For example, in the joint portion 203, copper can be diffused to the range from about 15 μm to about 50 μm from the copper first metal 201 to the aluminium second metal 202. In the joint portion 203, aluminium can be diffused to the range from about 1 μm to about 10 μm from the aluminium second metal 202 to the copper first metal 201. In a region where copper is diffused to aluminium, a diffusion layer mainly containing $CuAl_2$ and dendrite eutectic of aluminium can be formed. In a region where aluminium is diffused to copper, a diffusion layer mainly containing $Cu_9A_{14}$ can be formed. Such a joint state can be determined by observing a cross section of the joint portion 203 with an SEM, for example.

As illustrated in FIG. 4, in the terminal component 200 described above, the joint portion 203 joined by diffusion of metals is formed at the interface 202a2 between the first metal 201 and the second metal 202. The joint portion 203 that has a portion joined by diffusion of metals has a low conduction resistance, in spite of the use of different types of metals. At the interface 202a2 between the first metal 201 and the second metal 202, the insulating portion 202b is locally formed. Thus, in resistance welding, joint is performed in a narrower area because of current concentration, and joint strength of the joint portion 203 increases. Even when an external force due to, for example, vibrations is applied to the terminal component 200, a joint state of the joint portion 203 is easily maintained. That is, durability of the terminal component 200 is enhanced.

In the embodiment described above, the joint portion 203 of the terminal component 200 includes the center of the interface 202a2. The terminal component 200 with this configuration is used as the external terminal 43b of the lithium ion secondary battery 10 so that an electrolyte does not easily enter the interface between the first metal 201 and the second metal 202, and the joint portion 203 is not easily corroded in the resulting structure. In addition, the bus bar is attached to the terminal component 200 used as the external terminal 43b, and even in transfer of vibrations through the bus bar, a large force is less likely to be applied to the joint portion 203 because the joint portion 203 includes the center of the recess 202a.

In the lithium ion secondary battery 100 including the battery case 41 and the electrode terminals 42 and 43 attached to the battery case 41, the electrode terminals 42 and 43 may include a portion constituted by the terminal component 200.

Various types of the terminal component and the secondary battery disclosed here have been described above. The present disclosure is not limited to, for example, the embodiments of the terminal component and the battery disclosed here unless otherwise specified. The battery disclosed here can be modified in various ways, and the constituent elements and the processes described here can be appropriately omitted or appropriately combined unless no particular problems arise.

For example, in the embodiment described above, the second metal 202 whose inside is wider than the opening 202a1 is overlaid on the first metal 201 including the shaft 201a and the flange 201b extending radially outward from one end of the shaft 201a. The first metal, however, is not limited to the example including the flange. For example, the first metal may be configured to have a portion projecting from the shaft and entering the recess of the second metal. A portion of the first metal entering the recess of the second metal is not continuously formed, and may be intermittently formed.

In the embodiment described above, the recess 202a of the second metal 202 is a tapered surface that tilts from the opening 202a1 toward the bottom portion 202a2. The flange 201b of the first metal 201 has a shape in conformity with the recess 202a. This example is not restrictive, and the recess may have a shape in which a center portion of a side surface is enlarged.

In the embodiment described above, one joint portion 203 is formed to include the center of the recess 202a of the second metal 202. However, the number and position of joint portions are not specifically limited. A plurality of joint portions may be provided. The joint portion may be provided in a side surface of the recess of the second metal. The number and position of joint portions are appropriately set depending on, for example, the shapes of the first metal and the second metal.

What is claimed is:

1. A terminal component of a secondary battery, the terminal component comprising:
    a first metal; and
    a second metal on which the first metal is overlaid,
    wherein
    the second metal has a recess in a portion on which the first metal is overlaid,
    the recess includes an opening, a bottom portion, and a tapered side surface that gradually tapers from the bottom portion towards the opening,
    the first metal has a flange portion entering the recess from the opening, the flange portion includes a top surface facing toward the bottom portion of the recess and a peripheral surface facing toward the tapered side surface,
    a joint portion is disposed at an interface between the flange portion of the first metal and the bottom portion of the recess of the second metal, the joint portion being joined by metal diffusion,
    the second metal includes an insulating portion subjected to an insulating process in a portion including the tapered side surface and the bottom portion except for the joint portion,
    the top surface of the flange portion includes the joint portion, and
    the insulating portion is in direct contact with the peripheral surface of the flange portion and a remainder of the top surface other than the joint portion.

2. The terminal component according to claim 1, wherein the joint portion includes a center of the interface.

3. The terminal component according to claim 1, wherein the insulating portion is a layer formed by any one of anodic oxide coating, nickel plating, or resin coating.

4. The terminal component according to claim 1, wherein
    the bottom portion of the recess has a substantially circular shape,
    the joint portion is at a center of the bottom portion of the recess, and
    the insulating portion is at a remainder of the bottom portion.

5. A secondary battery, comprising:
    a battery case; and
    an electrode terminal attached to the battery case,
    wherein
    the electrode terminal includes a portion constituted by a terminal component,
    the terminal component includes
    a first metal; and
    a second metal on which the first metal is overlaid,
    the second metal has a recess in a portion on which the first metal is overlaid,
    the recess includes an opening, a bottom portion, and a tapered side surface that gradually tapers from the bottom portion towards the opening,
    the first metal has a flange portion entering the recess from the opening, the flange portion includes a top surface facing toward the bottom portion of the recess and a peripheral surface facing toward the tapered side surface,
    a joint portion is disposed at an interface between the flange portion of the first metal and the bottom portion of the recess of the second metal, the joint portion being joined by metal diffusion,
    the second metal includes an insulating portion subjected to an insulating process in a portion including the tapered side surface and the bottom portion except for the joint portion,
    the top surface of the flange portion includes the joint portion, and
    the insulating portion is in direct contact with the peripheral surface of the flange portion and a remainder of the top surface other than the joint portion.

6. A method for manufacturing a terminal component, the method comprising:
    preparing a first metal;
    preparing a second metal; and
    energizing the first metal and the second metal and joining a part of an interface between the first metal and the second metal,
    wherein
    said preparing the second metal includes providing a recess in a portion on which the first metal is be overlaid,
    the recess includes an opening, a bottom portion, and a tapered side surface that gradually tapers from the bottom portion towards the opening,
    in said joining, a flange portion of the first metal enters the recess from the opening, the flange portion includes a top surface facing toward the bottom portion of the recess and a peripheral surface facing toward the tapered side surface, the second metal includes a to-be-joint portion to be joined to the flange portion of the first metal at the interface, said preparing the second metal includes providing an insulating portion of the second metal, the insulating portion being subjected to an insulating process in a portion including the tapered side surface and the bottom portion except for the to-be-joint portion, the top surface of the flange portion includes the to-be-joint portion, and when the first metal and the second metal are joined together at said joining, the insulating portion is in direct contact with the peripheral surface of the flange portion and a remainder of the top surface other than the to-be joint portion.

7. The method for manufacturing a terminal component according to claim 6, wherein the to-be-joint portion includes a center of the interface.

8. The method for manufacturing a terminal component according to claim 6, wherein the insulating portion is a layer formed by any one of anodic oxide coating, nickel plating, or resin coating.

9. The method for manufacturing a terminal component according to claim 6, wherein the preparing the second metal includes providing the to-be-joint portion in a surface of the second metal subjected to the insulating process by removing the insulating portion with any one of an ultrasonic process, a cutting process, or a laser abrasion process.

* * * * *